United States Patent
Chraplyvy et al.

(10) Patent No.: US 6,694,099 B2
(45) Date of Patent: Feb. 17, 2004

(54) POWER AND WAVELENGTH MANAGEMENT FOR MIXED-RATE OPTICAL DATA SYSTEMS

(75) Inventors: Andrew Roman Chraplyvy, Matawan Township, Monmouth County, NJ (US); Kenneth Lee Walker, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/382,706

(22) Filed: Mar. 6, 2003

(65) Prior Publication Data

US 2003/0156841 A1 Aug. 21, 2003

Related U.S. Application Data

(62) Division of application No. 09/231,033, filed on Apr. 14, 1999, now Pat. No. 6,580,536.

(51) Int. Cl.[7] .................................................. H04J 14/02
(52) U.S. Cl. ........................... 398/79; 398/27; 398/34; 398/38
(58) Field of Search ............................ 398/27, 34, 38, 398/74, 75, 79, 68, 91

(56) References Cited

U.S. PATENT DOCUMENTS

| | | | | | |
|---|---|---|---|---|---|
| 6,002,503 A | * | 12/1999 | Mizrahi | ........................ | 398/85 |
| 6,046,833 A | * | 4/2000 | Sharma et al. | ................. | 398/48 |
| 6,583,909 B1 | * | 6/2003 | Wada | ..................... | 359/337.13 |

FOREIGN PATENT DOCUMENTS

GB 2232548 * 12/1990

* cited by examiner

*Primary Examiner*—Leslie Pascal

(57) ABSTRACT

An optical transmission system exploits the reduced signal-to-noise (SNR) requirements for low-bit rate channels to devise a new wavelength channel allocation scheme which increases the number of channels that a WDM system can support. Wavelengths of low-bit rate channels are assigned outside a flat-gain window (i.e., flat-passband region) of the system. The channel allocation scheme uses the high-bit rate channels located in the flat-passband region of wavelengths and the lower-bit rate channels located outside this passband region with progressively lower-bit rate channels located farther outside this passband region. Low-bit rate channels are also assigned to region(s) of the passband where the non-linear threshold power level of the system may be exceeded.

5 Claims, 3 Drawing Sheets

POWER AND WAVELENGTH MANAGEMENT FOR MIXED-RATE OPTICAL DATA SYSTEMS

This application is a Divisional application of A. R. Chraplyvy 30–82; Ser. No. 09/231,033, now U.S. Pat. No. 6,580,536 Filed on Jan. 14, 1999.

TECHNICAL FIELD OF THE INVENTION

This invention relates to optically amplified lightwave systems and, more particularly, to a method and apparatus for power and wavelength management for a mixed-rate optical data system.

BACKGROUND OF THE INVENTION

In optically amplified lightwave systems, system performance of a given wavelength channel is determined, to first order, by its optical signal to-noise ratio (SNR). For higher bit rates larger SNRs (consequently higher signal powers) are required. (This can also be explained by realizing that the number of photons/bit required by a receiver is, again to first order, roughly independent of the bit rate; consequently higher bit rates require higher signal powers.) Presently in wavelength-multiplexed (WDM) systems, the bit rates of all channels are the same. Therefore the launch powers of all signals are nominally the same.

Unfortunately under certain circumstances, the transmission of all signal channels at the same data bit rate and at the same launch power level can adversely affect system performance.

SUMMARY OF THE INVENTION

In accordance with the present invention, we exploit the reduced SNR requirements for low-bit rate channels to devise a new wavelength channel allocation scheme of a WDM system which increases the number of channels an optical transmission system can support. We assign the wavelengths of low-bit rate channels outside a flat-gain window (i.e., flat-passband region) of the amplifiers. Moreover, our channel allocation scheme has the high-bit rate channels located in the flat-passband region of wavelengths and the lower-bit rate channels located outside this passband region with progressively lower-bit rate channels located farther outside this passband region.

More particularly, in accordance with our invention, a wavelength division multiplexed (WDM) system comprises (1) at least one optical amplifier for amplifying optical wavelengths in at least two regions, each region exhibiting a different transmission gain characteristic for all wavelengths within that region; (2) at least one first-type transmitter, each first-type transmitter transmitting an optical wavelength selected from a first region of said at least two regions and modulated at a data bit rate at or below a first data bit rate and (3) at least one second-type transmitter, each second-type transmitter transmitting an optical wavelength selected from a second region of said at least two regions and modulated at a data bit rate at or below a second data bit rate, where the second bit rate is lower than the first bit rate.

According to one aspect of our invention, the first region is a flat-passband transmission region of the system having a gain characteristic which falls within a predetermined range and the second region has a gain characteristic outside that predetermined range. According to one embodiment, the second region is located in a roll-off region of the system gain characteristic. In yet another embodiment, each second-type transmitter transmits at a wavelength within the second region the data bit rate which is selected so that the output power level for said each wavelength in the second region does not exceed the non-linear threshold level of the transmission fiber of the system.

The method of our invention comprises the steps of (1) determining the transmitted power versus wavelength characteristics of the system for each wavelength used in a WDM system; (2) for at least one wavelength having a transmitted power level within a predetermined range, selecting a transmission data bit rate at or below a first data bit rate; and (3) for at least one wavelength having a transmitted power level outside said predetermined range, selecting a transmission data bit rate at or below a second data bit rate, said second data bit rate being lower than the first data bit rate.

BRIEF DESCRIPTION OF THE DRAWING

In the drawings.

In the following description, identical element designations in different figures represent identical elements.

DETAILED DESCRIPTION

Figure 1:
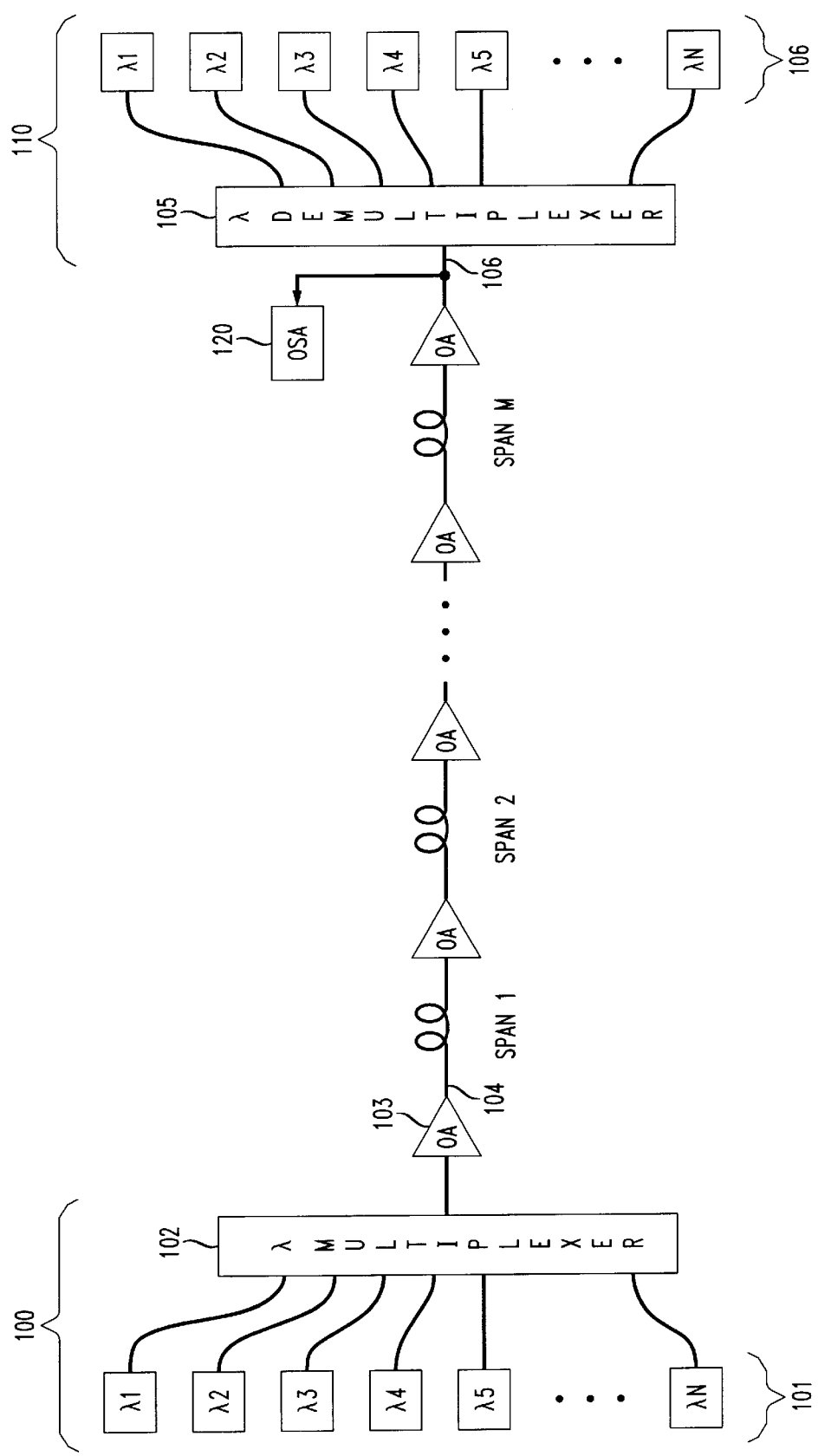
FIG. 1 shows an illustrative block diagram of a data transmission system useful in describing the operation of the present invention.

FIG. 1 shows an illustrative block diagram of a wavelength division multiplexed (WDM) data transmission system in which the method and apparatus of the present invention may be utilized. As shown, the transmitter location 100 includes N transmitters 101 connected through a wavelength multiplexer 102 and an optical amplifier 103. Each of the transmitters 101 transmit at a different wavelengths $\lambda 1$–$\lambda N$ and are modulated at a data bit rate. The output 104 from the transmitter location 100 is transmitted over M of optical spans, 1–M, to a receiver location 110. Each optical span, 1–M, includes an optical fiber section and an optical amplifier OA. Each span 1–M has essentially zero loss/gain, the amplifier OA providing optical gain to compensate for the optical loss in the fiber section. The receiver location 110 includes a wavelength demultiplexer 105 which demultiplexes the received wavelengths.

Figure 2:
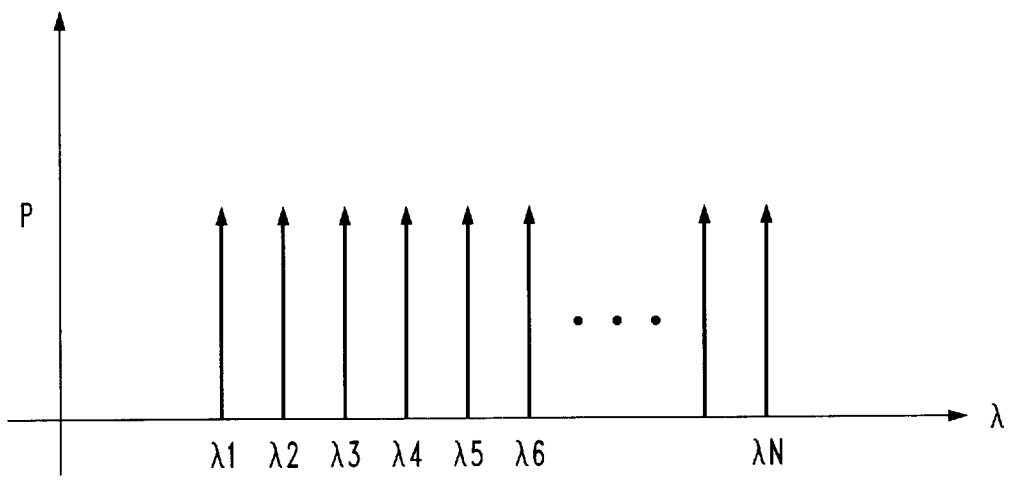
FIG. 2 shows, illustratively, the launch power level for each of the optical wavelength signals being transmitted over the system.

Shown in FIG. 2, is the signal at the output 104 of the transmitter location 100. In the prior art, each of the N transmitters 101 transmit at different wavelengths $\lambda 1$–$\lambda N$, but each of the transmitters 101 was modulated to transmit at the same data bit rate and at the same power level.

Figure 3:
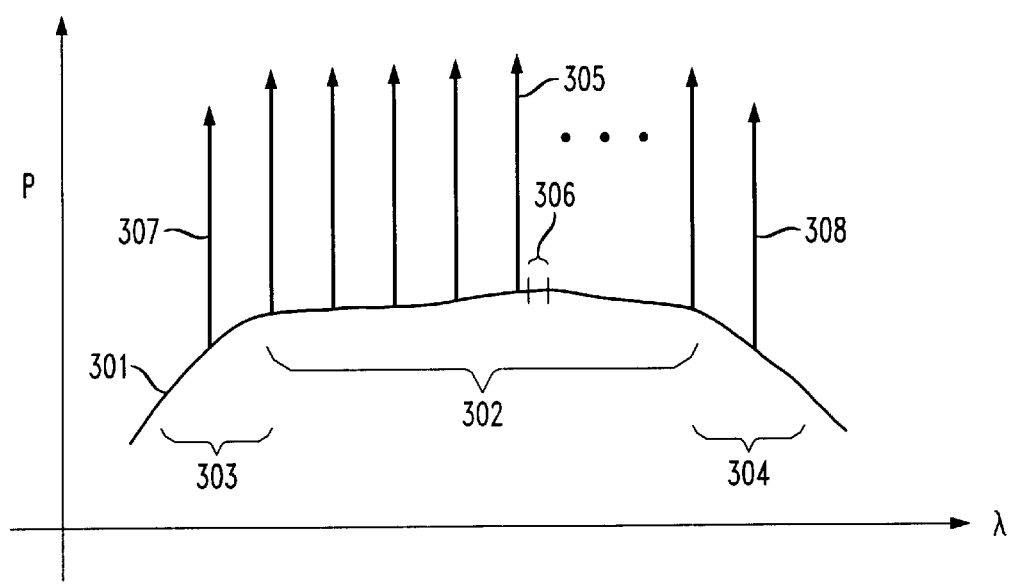
FIG. 3 shows, illustratively, the output power level of each of the optical signals at the receiver location of the system.

FIG. 3 shows, illustratively, the output power level of each of the optical signals received at the input 106 at receiver location 110, as measured using an optical spectrum analyzer (OSA) 120 of FIG. 1. The shape of the power spectrum 301 of the received signal is the result of the cascaded gain versus wavelength characteristics of the system of FIG. 1. Each of the amplifiers OA exhibit, to one degree or another, "gain shaping" which when cascaded together provides a wavelength window (hereinafter a passband region) of operability shown in FIG. 3. That is, as a result of this amplifier gain shaping, the received power spectrum 301 generally has a passband-type characteristic where the power level in a central passband region 302 is relatively flat (i.e., having a gain within a predetermined dB range) and the power spectrum rolls-off at a significant rate in the region below, 303, and in the region above, 304, the flat-passband region 302. Normally, in prior art WDM systems with all wavelength channels operating at the same bit rates, channels located within the passband region 302 will generally be operating at substantially the same signal-to-noise ratio (SNR). The SNR for a particular wavelength channel is determined by the ratio of the signal, e.g., 305, to the noise level in that channel, e.g., 306. The noise is generally the result of the amplified spontaneous emission (ASE) noise generated in the amplifiers OA. Since the ASE noise is broadband, it has a spectrum that essentially tracks the amplifier power spectrum 301. The noise level spectrum is such that at wavelengths beyond the edges of the passband 301 (i.e., roll-off regions 303 and 304), the noise level has not fallen-off as fast as the signal level and, as a result, the SNR has deteriorated for wavelengths in the regions below 303 and above 304 the passband 302. Consequently, in prior art WDM systems they have either avoided using these wavelength channels located outside the passband region 302 or they have suffered a deterioration of performance at these wavelength channels due to operation at a reduced SNR.

In accordance with the present invention, we have determined how to improve the transmission performance at wavelength channels in the regions below 303 and above 304 the passband 301. Since low-bit rate signals tolerate lower SNRs, we propose locating low-bit rate wavelength channels in the regions 303 and 304 outside the passband region 301 of flat gain. Our wavelength channel allocation scheme uses high-data bit rate channels in the passband region 301 and lower-data bit rate channels located outside this passband region 301 (i.e., in regions 302 and 303). Our technique also uses progressively lower-bit rate channels for wavelengths that are farther outside this passband region 301.

Figure 4:
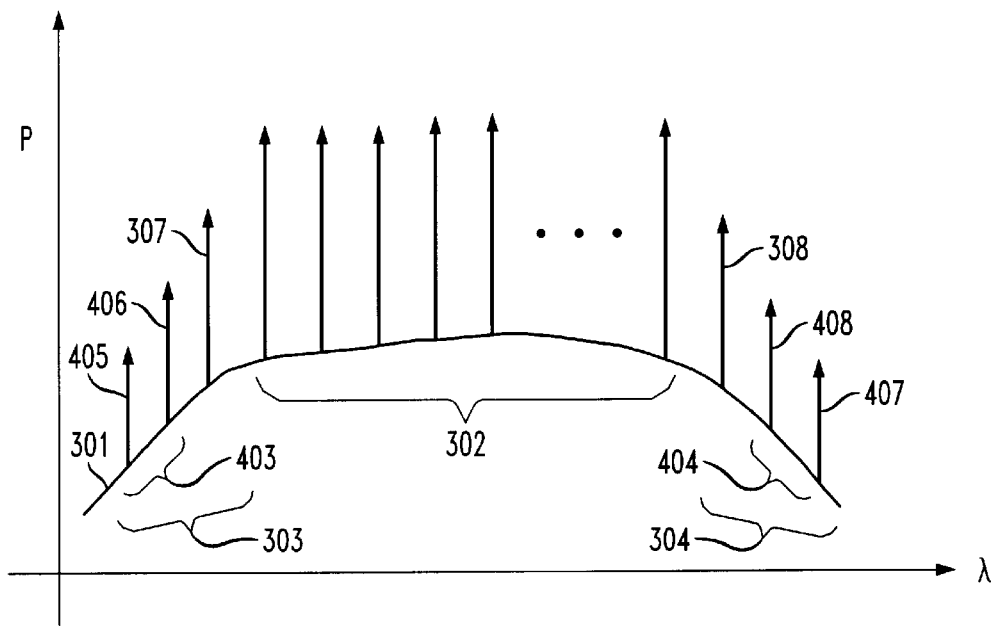
FIG. 4 shows, in accordance with the present invention, that certain wavelength signals of FIG. 3 should be transmitted at reduced data bit to improve their performance in the presence of the existing noise levels.

FIG. 4 shows, in accordance with the present invention, that the wavelength channels 307 and 308 in regions 303 and 304, respectively, of FIG. 3 located outside this passband region 301 are transmitted at reduced data bit rates (compared to the data bit rates of the wavelengths in passband range 302) to compensate for their reduce signal levels. Since reliable transmission at a lower bit rate reduces the SNR required for reliable transmission, a reduced bit rate can be found to improve performance for wavelength channels 307 and 308 in the presence of the existing noise levels. It should be noted that while the present invention limits the maximum data rate in the roll-off regions 303 and 304 to be less than the maximum data rate in passband region 302, obviously the data rates used by a wavelength channel in any of these regions could always be less than the maximum rate for that region. Our technique also enables additional wavelength channels in regions 403 and 404, also operating at a reduced bit rate, to be satisfactorily operated in the regions 303 and 304. In prior systems, the wavelength channels in regions 403 and 404 were never utilized because of their poor SNR (at the higher data bit rates). As noted, to obtain satisfactory performance the wavelength channels in regions 403 and 404 will have a maximum data bit rate that decreases proportionally with decreases in the power spectrum 301. That is, the farther a wavelength is located away from the passband 301, the lower will be the maximum data bit transmission rate for that wavelength. In our example in FIG. 4, the maximum data bit rate for wavelength 405 (407) is lower than for wavelength 406 (408) and the maximum data bit rate wavelength 406 (408) is lower than for wavelength 307 (308).

Thus our invention contemplates optical transmission systems in which the data bit rates of wavelength channels multiplexed on the same fiber are not all the same. For example, there could be a mixture of the standard transmission rates from OC-192 (10 Gb/s) to OC-3 (155 Mb/s) or lower transmitted on the same fiber. Obviously, the techniques of the present invention is not limited to the use of these standard transmission rates but can use any bit rates.

Figure 5:
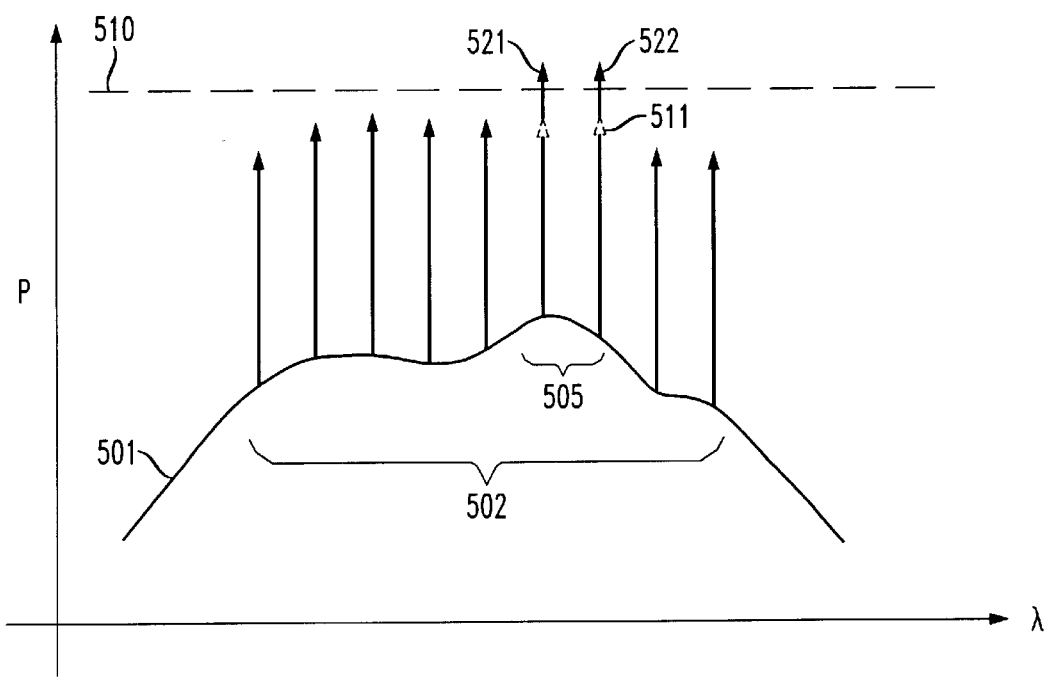
FIG. 5 shows, in accordance with the present invention, which wavelength signals should be transmitted at reduced data bit and output power levels so that they do not exceed the non-linearity threshold of the of the transmission fiber of the system.

FIG. 5 shows, another aspect of the present invention, where selected wavelength channels are operated at a reduced data bit and output power levels since when they would otherwise have exceeded the non-linearity threshold of the system amplifiers. The illustrative power spectrum 501 shows an optical system having a passband region 502 that includes a region 505 where the non-linearity threshold 510 has been exceeded. The non-linearity threshold 510 is the power level above which the optical fibers of the system operate in a non-linear manner. Operating the optical fibers in this non-linear region would have a deleterious affect on system performance. Thus, in our example, the power level of wavelengths 521 and 522 cause non-linear operation in the system fibers. We have recognized that if the signal levels of channels 521 and 522 is reduced below the non-linear threshold level 510, the operating data bit rates of channels 521 and 522 could be reduced proportionally to a lower data bit rate which would maintaining the desired level of system performance at this lower data bit rate. This occurs as previously discussed, because lower bit rate signals can operate satisfactorily at a lower SNR level than higher bit rate signals. Thus, we select the new reduced signal level 511 for channels 521 and 522 so that it would not exceed the non-linearity threshold 510 and then select a bit rate at that reduced signal level that results in satisfactory system data transmission performance for channels 521 and 522 (e.g., the desired system error rate performance).

The mixed bit rate data transmission of the present invention is desired in situations where (1) the SNR is poor for some wavelength channels and (2) power needs to reduced for some wavelength channels to avoid non-linear operation.

Significant cost savings can be realized by purposely using lower-power transmitters for lower-bit rate channels. Not only are such transmitters cheaper but fiber nonlinear effects are reduced if less optical power is launched. Also, systems limited by total amplifier output power can accommodate more channels. (Technology and cost place constraints on the total amplifier power. Also, safety concerns place limits on the total power.) With this strategy some care needs to be taken in wavelength allocation. Low-power (low bit rate) channels probably should not be interspersed among high-power (high bit rate) channels because of potential filtering problems. A neighboring high power channel will interfere with a low-power channel because of finite filter rejection. Therefore in such situations, low-power channels could be "banded" together (e.g., 303 and 304 of FIG. 3 and 503 of FIG. 5) and high-power channels could be in separate wavelength bands (e.g., 302 of FIG. 3). Moreover, our channel allocation scheme enables the high-bit rate channels to be utilized in the passband region (302 of FIG. 3) and the lower-bit rate channels to be utilized regions (e.g., 303 and 304 of FIG. 3) outside this passband region, with progressively lower-bit rate channels located farther outside this passband region. Additionally, lower bit rate channels can also be utilized and banded together in regions (e.g., 505 of FIG. 5) where the non-linear threshold may be exceeded. Thus, if a plurality of bit rates are used by the wavelength channels of the passband region 302, the wavelength channels closest to the roll-off regions 303 and 304 and peak-gain region 505 should use the lowest bit rates to minimize interference with the wavelength channels in regions 303, 304, or 505. Similarly, if a plurality of bit rates are used by the wavelength channels of the roll-off regions 303 and 304 and peak-gain region 505, the wavelength channels closest to the passband region 302 should use the highest bit rates to minimize interference with the wavelength channels in the passband region 302.

What has been described is merely illustrative of the application of the principles of the present invention. Other methods and arrangements can be implemented by those skilled in the art without departing from the spirit and scope of the present invention.

What is claimed is:

1. A method of operating a wavelength division multiplexed (WDM) system comprising the steps of determining the transmitted power versus wavelength characteristics of the system for each wavelength used in the system;

for at least one wavelength having a transmitted power level within a predetermined range, selecting a transmission data bit rate at or below a first data bit rate; and for at least one wavelength having a transmitted power level outside said predetermined range, selecting a transmission data bit rate at or below a second data bit rate, said second data bit rate being lower than the first data bit rate.

2. The method of claim 1 wherein for each wavelength outside said predetermined range, the data bit rate is selected so that the output power level for said each wavelength does not exceed the non-linear threshold level of transmission optical fiber used in the system.

3. The method of claim 1 wherein each wavelength located outside said predetermined range is in a roll-off region of the transmitted power versus wavelength characteristics of the system.

4. The method of claim 1 including a group of at least two wavelengths located outside said predetermined range, each wavelength of said group being modulated at a different data bit rate and wherein a wavelength in said group which is closest to the predetermined range is selected to transmit at a higher data bit rate than other wavelength located in said group.

5. The method of claim 1 including a plurality of wavelengths located within said predetermined range, each wavelength of said plurality being modulated at a different data bit rate and wherein a wavelength in said plurality which is closest to a wavelength located outside said predetermined range is selected to transmit at a lower data bit rate than other wavelength located in said plurality.

* * * * *